J. S. BUELL & S. A. W. MARSH.
GRAIN DRIER.
No. 44,512. Patented Oct. 4, 1864.
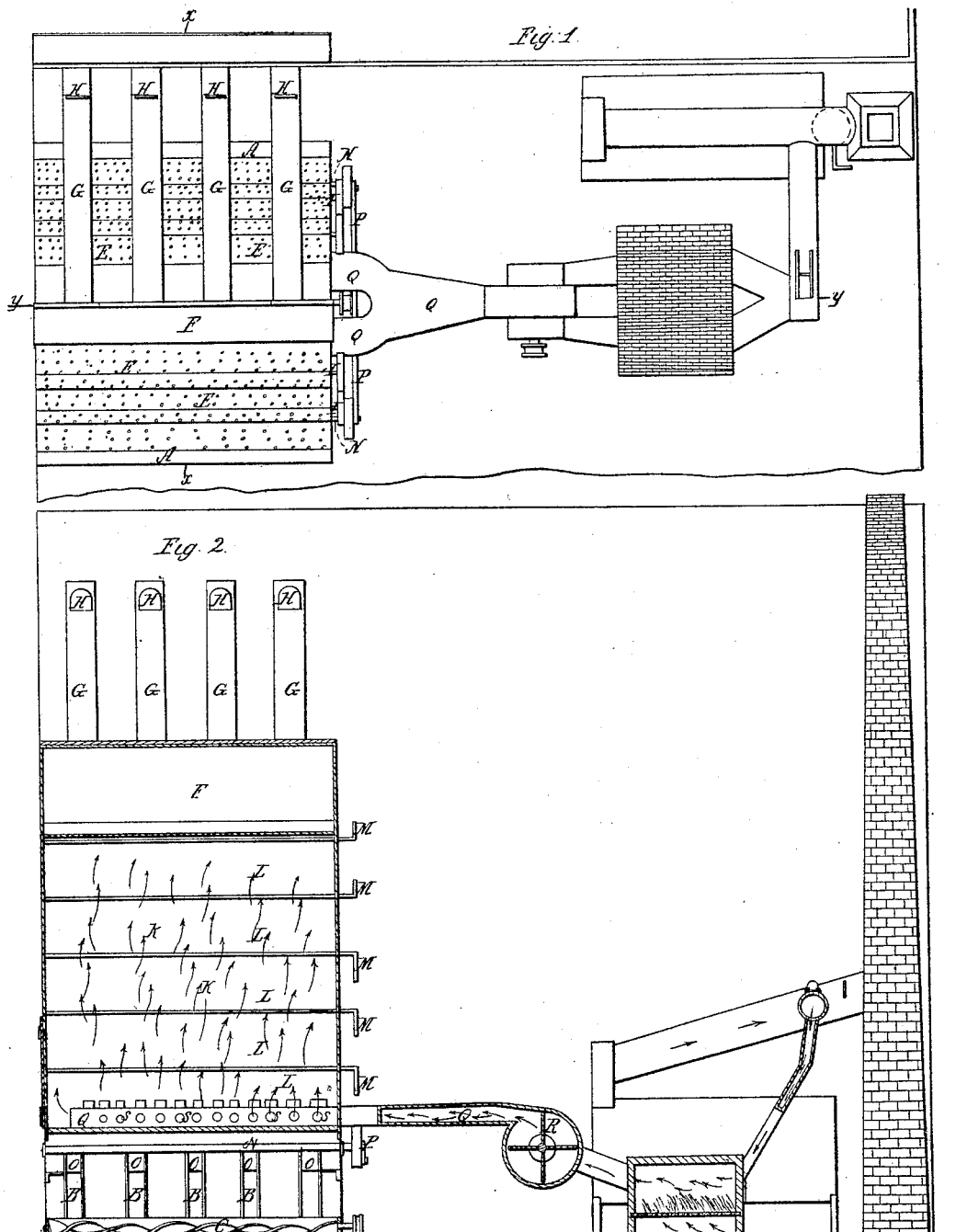

2 Sheets—Sheet 2.

J. S. BUELL & S. A. W. MARSH.
GRAIN DRIER.

No. 44,512. Patented Oct. 4, 1864.

Witnesses:
Chas. E. Hose
James T. Graham

Inventors:
Jonathan S. Buell
Samuel A. W. Marsh
By Thos. P. How
Atty

UNITED STATES PATENT OFFICE.

JONATHAN S. BUELL AND SAML. A. W. MARSH, OF BUFFALO, NEW YORK.

IMPROVED GRAIN-DRIER.

Specification forming part of Letters Patent No. 44,512, dated October 4, 1864.

*To all whom it may concern:*

Be it known that we, JONATHAN S. BUELL, of Buffalo, in the county of Erie and State of New York, and SAMUEL A. W. MARSH, of Buffalo, in the county of Erie and State of New York, have invented new and useful improvements in apparatus or machinery for drying and curing all kinds of grain, seeds, malt, hops, and similar substances; and we do hereby declare the following to be a full, clear, and exact description thereof, reference being had to the accompanying drawings, and to the letters of reference marked thereon, in which—

Figure 3:
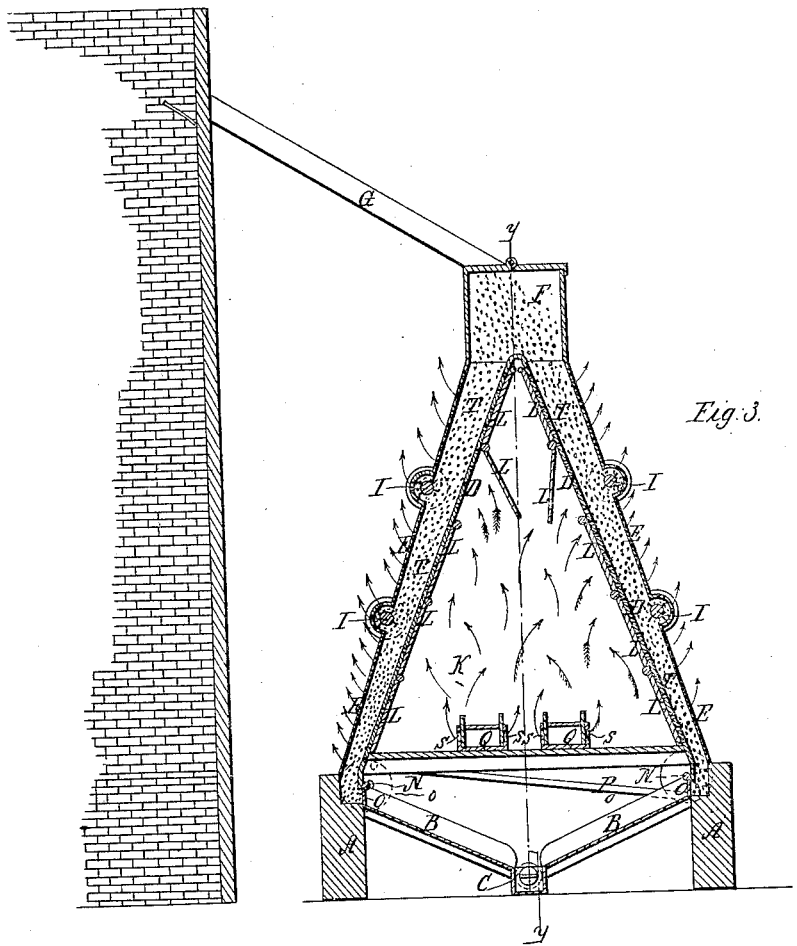
Figure 4:
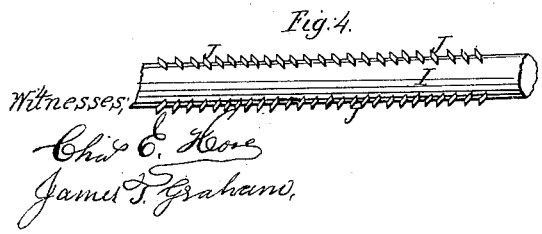
Figure 5:

Figure 1 is a plan or top view of the apparatus. Fig. 2 is a vertical longitudinal section through the line $y\,y$. Fig. 3 is a vertical cross-section through the line $x\,x$. Fig. 4 is a view of one of the revolving shafts; and Fig. 5 is a cross-section of the same.

Our invention and improvements consist of an apparatus for drying and curing all kinds of grain, seeds, malt hops, and all similar substances with the greatest economy in fuel, labor, and material, occupying but little space as compared with other plans heretofore in use, and conforming more closely to the principles of natural laws.

We construct our drying apparatus at any convenient place suited to the purpose, usually within a suitable building, where we can have perfect ventilation and accessible to or adjoining a grain warehouse or elevator where grain or the substances intended to be dried can be easily handled, and upon a foundation, A, of stone, brick, or iron work of sufficient height to allow space for the discharging-spouts B and conveyer C. Upon this foundation we erect a series of rafters or frame-work, of iron or other material, the length or height of which rafters is regulated by the width of the base we occupy and the capacity of the apparatus we intend to construct. These rafters or frames may be in pairs and self-supported at their upper ends; or they may be single, their upper ends being supported by a wall of masonry or by iron-work. Said series of rafters or frames may be extended lengthwise to any required distance, the distance being regulated by the length of the base we occupy and other local circumstances. The rafters or frames are placed in an inclined position or upon an angle between a horizontal and vertical one, and are kept in position laterally by cross-bars between the rafters. Upon the rafters or frames is supported a lattice-work, of iron or other suitable material, so constructed as to occupy the least possible space, present the least possible obstruction to the passage of the air, and at the same time to possess great strength. Upon this lattice-work, supported by the rafters, we affix, in a permanent and substantial manner, perforated iron plates D, wire-gauze, perforated tile, or other suitable material. Said perforated plates are securely fastened to the lattice-work beneath by rivets and by iron bolts, said bolts having a shoulder, washer, or a flat ring and a key-hole or screw-thread at each end. The bolts from shoulder to shoulder are of a length equal to the breadth or thickness of the intended grain or drying chamber T, and they may be of uniform length, making the breadth or thickness of the grain-chamber T the same throughout; but we prefer to make the bolts of a graduated length, so that the breadth or thickness of the grain-chamber may be one or two inches greater at the upper than at the lower part. By this means the passage of the heated air through the lower part of the chamber, where the grain is more closely packed, and through the upper part, where the grain is more loosely packed, will be more uniform than with any other construction.

To complete the grain-chamber, we attach to a frame or lattice work, of cast-iron or other suitable material in sections, perforated iron plates E, wire-gauze, or perforated tile, also in sections, which sections are firmly secured to the free ends of the before-described bolts by keys, nuts, or in any other convenient way. The construction of the said lattice-work and perforated plate in sections facilitates the removal of any part for repairs or the removal of obstructions from within the chamber.

The ends of the grain-chamber may be closed with perforated plates, with brick-work, or with sheet-iron. We prefer iron plates, as they may be made serviceable for sustaining bearings for shafts and dampers.

At the bottom of the grain-chamber we construct a series of openings for the discharge of grain, with angular or sloping sides within the chamber, forming what is known as a "hopper-bottom," so that the grain or other substance undergoing treatment may by its own weight find the outlet.

At the top of the grain-chamber, when the drier is constructed with a single grain-chamber and where the two chambers come together when the drier is constructed with a pair of grain-chambers, we construct a box, F, with closed top or extend the outer sides and the ends of the chambers about four feet above the perforated plates. Said box may be made of any suitable material, as economy or convenience may dictate.

A series of closed spouts G, furnished with slides, gates, or dampers H, leads from a bin or receiver containing the grain or substance to be treated and opens into said box or grain-chamber. These spouts are so placed and arranged as to afford an equal flow of grain into the box along its entire length, and is designed to keep the grain-chambers always full when the drier is in operation; or the box F may be made larger and may be filled by other well-known modes, as economy and convenience may dictate.

Within the grain-chambers and between the perforated sides we introduce one or more shafts, I, (the number depending upon the height and size of the drier,) supplied with two or more rows of teeth, J, so arranged as to stir or mix the grain, but not to carry it in a direction with the line of the shaft.

The agitators I are designed to in part support the grain, so that the downward pressure may be relieved and the body of grain throughout the chambers may be kept more equal and uniform than could otherwise be.

In order that the movement of the grain or other substance within the chamber as the shafts revolve may not be too rapid, a series of obstructions may be placed above the shaft and on a line therewith. Said obstructions may be made of rods and bolts, so as to permit the gradual downward passage of the grain.

Within the air-chamber K, and to the lower sides of the rafters, are attached dampers L, by means of which the passage of the heated air through the perforated plates and through the grain may be regulated and controlled, entirely obstructed, made to pass through any required part of the drier, or to pass through one part in larger quantities than through other parts, as circumstances may require, said dampers being regulated by means of the projecting parts M.

To the shafts N are attached a series of gates or valves, O, by which the flow of the grain or other substance from the openings at the bottom of the grain-chambers is regulated or entirely obstructed. Said shafts N are connected by a lever or bar, T, so attached and arranged that all the gates or valves may be opened simultaneously and to any required extent, so as to perfectly control the discharge of grain from the grain-chambers, and thus enable the operator to expose the grain or other substance to the action of the heated air for a greater or less time, according as its dampness may render necessary.

Leading from the openings where the grain or other substance is discharged is an apron or a series of discharging-spouts, B, through which the dried grain flows to the conveyer C, from which it is taken to a cooler for the purpose of removing the artificial heat, which cooler is constructed in substantially the same manner as the apparatus hereinbefore described, where the grain is exposed to the action of a blast of dry cold air, instead of a blast of dry heated air.

For drying purposes heated air is introduced into the air-chamber, which may be done in any known manner. The better method of doing this is by the use of a rotary or revolving fan, R, blowing or forcing a blast of hot air into the air-chamber through metallic pipes Q, having graduated openings S, so arranged as to give a uniform and equal distribution of the heated air throughout the chamber; or the pipes may be of different lengths, the number of pipes and their length being so proportioned as to give an equal distribution of the heated air throughout the chamber, in order that when it escapes from the pipes it may, as controlled by the damper, permeate all portions of the grain alike.

Operation: To operate this apparatus, by raising the slides H we admit the grain or substance to be dried through the closed spouts G into the closed box F, and thence into the grain-chamber T. Motion is communicated to the shafts I from the engine or from any other motive power, and they are geared in such a way as by their revolution to always carry the grain from the inner plate upward and outward toward the outer plate, stirring and mixing it thoroughly as it passes downward toward the discharging-spouts B.

The quantity discharged, and consequently the rapidity of the work, is regulated by the gates or valves O, and depends upon the dampness of the grain or other substance to be dried, and will always be equal and uniform as long as there is a supply of grain in the bin or box.

This invention and improvement in the apparatus for drying, curing, and cooling grain and other similar substances dispenses with a vast amount of manual labor in handling the grain to be dried, and also dispenses with the expensive and intricate machinery necessary to move it when being dried or cured upon a perforated horizontal plate. In large cities, where land is of great value, it economizes space, as the drying and cooling apparatus may be placed the one above the other, either within a building or without, with only sufficient covering to protect it from the weather, as may be most convenient.

Having thus fully described our invention, what we claim, and desire to secure by Letters Patent, is—

1. The combination, with the air-chamber K, of one or more inclined grain drying or cooling chambers, T, having perforated or open sides D and E, both of which are inclined in the same direction from a perpendicular line, substantially as and for the purpose set forth.

2. The combination, with each other, with the receiving-chest F, and with the air-chamber K, of two or more inclined grain drying or cooling chambers, T, having perforated or open sides, substantially as and for the purpose set forth.

3. Constructing the grain drying or cooling chambers T with perforated or open plates D and E, or their equivalent, both inclined in the same direction, but at unequal angles from a perpendicular line, in such a manner as to give an inclined space or chamber of gradually-diminishing thickness from the top to the bottom between the said plates D and E.

4. The combination and arrangement of the agitators I with the perforated plates D and E and the grain-chamber F, substantially as and for the purpose set forth.

5. The combination and arrangement of the shafts N and gates or valves O with the grain-chamber T, the discharging-spouts B, and the conveyer C, substantially as and for the purpose set forth.

6. The combination and arrangement of the dampers L with the perforated plates D, substantially as and for the purpose set forth.

SAMUEL A. W. MARSH.
JONATHAN S. BUELL.

Witnesses to the signature of Samuel A. W. Marsh:
L. A. ROBERTS,
JAMES T. GRAHAM.

Witnesses to the signature of Jonathan S. Buell:
TOWNSEND DAVIS,
JOHN A. HORN.